INVENTOR.
WALLACE F. MACGREGOR
BY James A. Walsh,
ATTORNEY

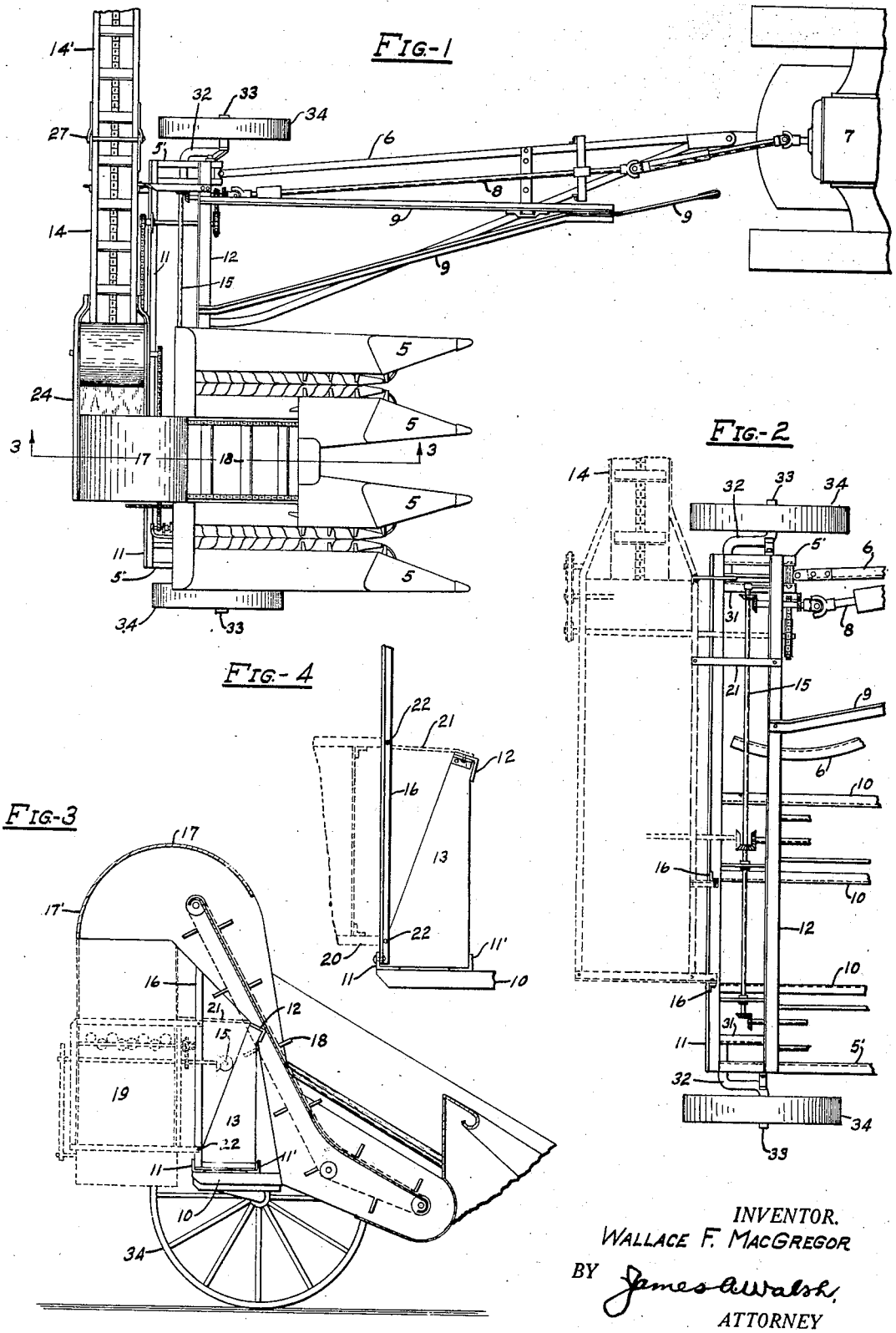

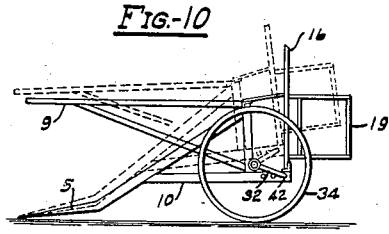
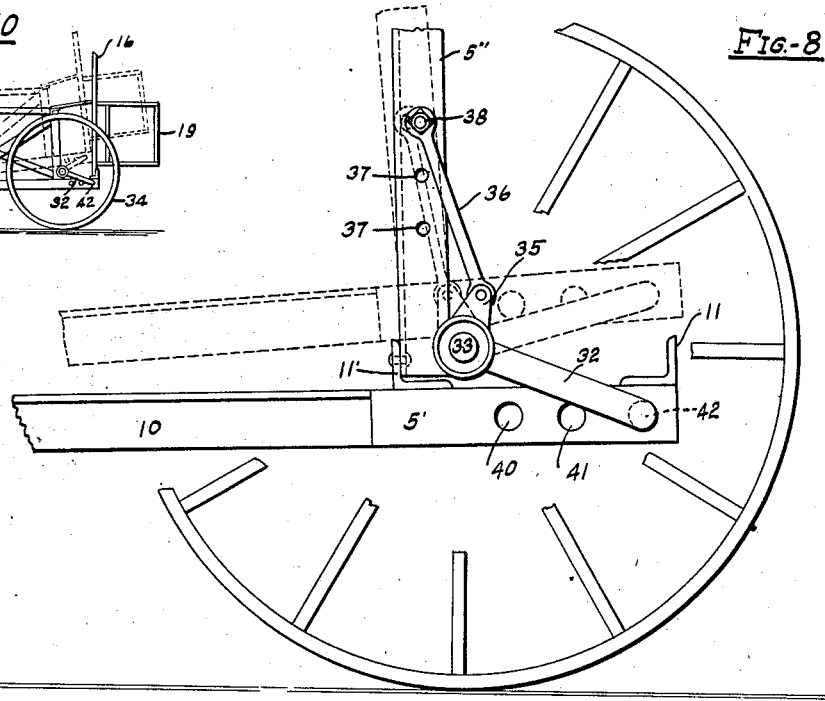
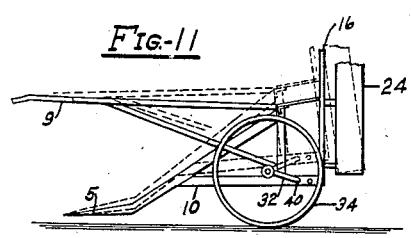
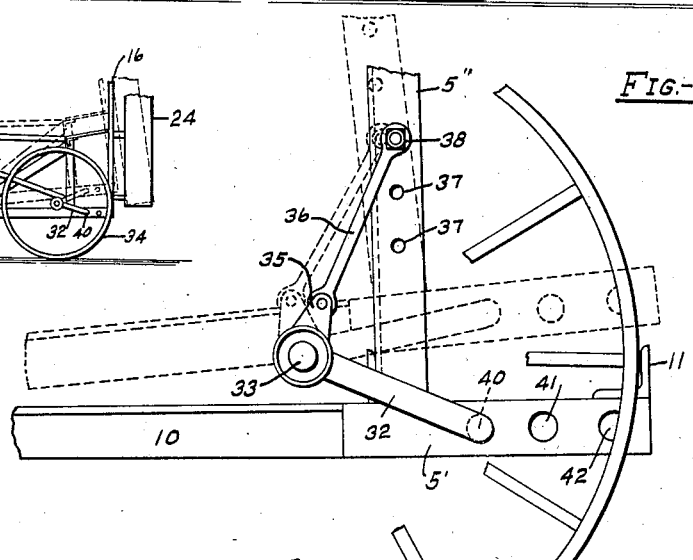
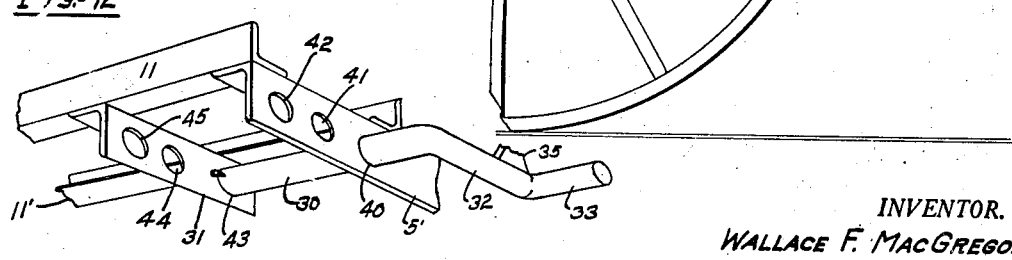

Patented Apr. 30, 1935

1,999,842

UNITED STATES PATENT OFFICE 1,999,842

CORN HARVESTING MACHINE

Wallace F. MacGregor, Racine, Wis., assignor to J. I. Case Company, Racine, Wis., a corporation Application July 3, 1934, Serial No. 733,591

10 Claims. (Cl. 56—18)

In the employment of corn harvesters of the power type it is desirable as the machine progresses through the field to dispose of the harvested crop by either conveying the material directly to a vehicle or other container in the condition in which it leaves the gathering units, or husking the ears and delivering the latter from the machine, or by shelling the ears and conveying only the kernels thereof to the receptacle, and, therefore, a machine manufactured for performing one of such operations, as commonly constructed, so far as I am aware, would not be practical for either or both of the other operations. It is my object, therefore, to construct a harvester of the type stated so that it may be readily equipped by the user with a conveyer, a husker, or a sheller, as necessities require, and each unit properly balanced, so that with the same machine a corn crop can be harvested as desired, according to its condition, and this I accomplish without altering or disturbing the general construction of such machine, this being a continuation in part of my application Serial No. 680,684, filed July 17, 1933. In so providing a machine of this character the user has the advantage of initially obtaining the equipment of his choice for harvesting in a particular manner, and subsequently, according to crop conditions, may obtain and substitute one or more of the other equipments, so that his primary investment is thus limited to a machine with a single detachable unit for which either of the other units may be substituted only as conditions require, in which manner a single machine embodying my improvements will serve the purpose of several by simply exchanging one unit for another, and thus tends to material economy for the user as well as to the advantage of the manufacturer in being enabled to supply separate units as required for machines in use in the fields.

Figure 5:
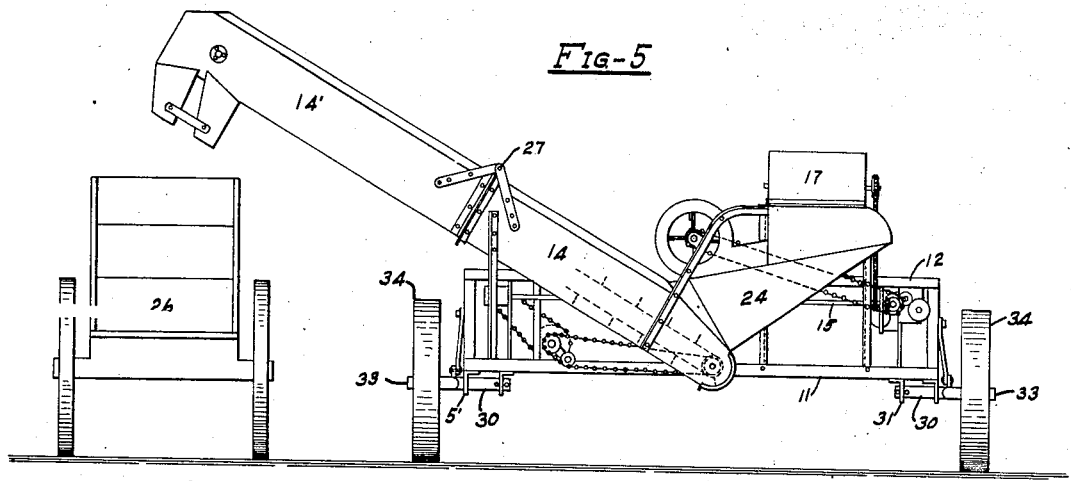
Figure 6:
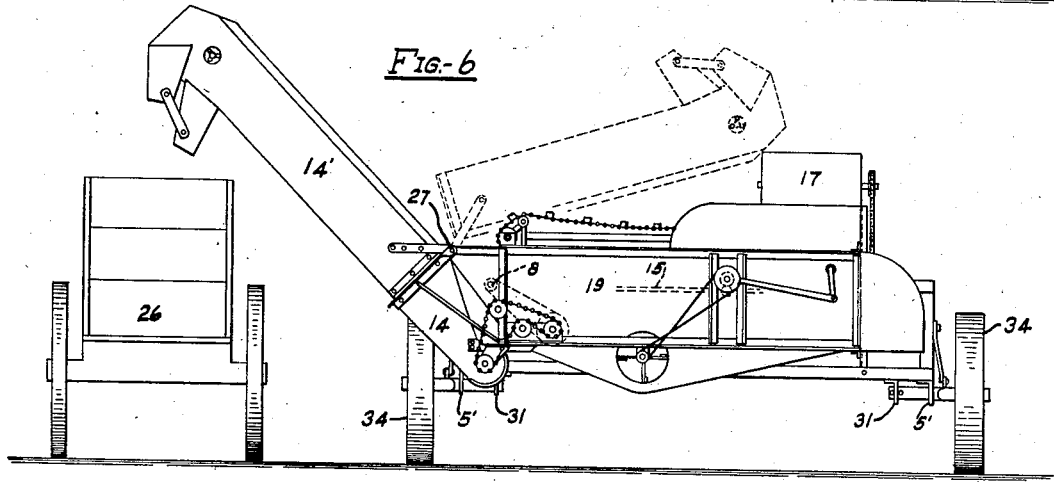
Figure 7:
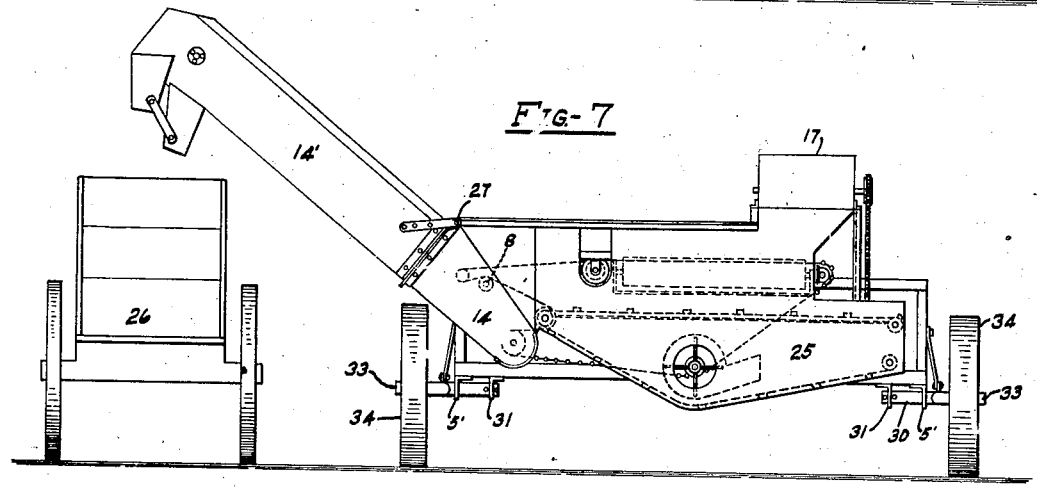

In the accompanying drawings, forming part hereof, Figure 1 is a plan view of a corn harvester having an elevator unit mounted thereon; Fig. 2, a fragmentary plan view of the frame with a unit attached thereto; Fig. 3, a sectional view taken on the dotted lines 3—3 in Fig. 1, showing a husking unit on the frame; Fig. 4, an enlarged detail showing the manner of attaching the units to the frame; Figs. 5, 6 and 7, rear elevations of the harvester showing a conveyor, a husker, and a sheller, respectively, mounted on the harvester, the latter being in position in relation to a vehicle for depositing the treated material thereinto or into a self-carried receptacle; Figs. 8 and 9, fragmentary side elevations showing adjustable balancing mechanism associated with the carrying wheels and frame; Figs. 10 and 11, diagrammatic views showing the range of vertical adjustability of the machine with attachable units applied thereto; and Fig. 12 is a perspective of one of the axle bearings as seen when looking upwardly toward the right-hand rear end of the machine in Figs. 5, 6 and 7.

In said drawings, the numeral 5 indicates the gathering points of a harvester embodying my improvement, which is provided with a drawbar 6 connected to a tractor 7 by which the machine is drawn and the parts thereof operated by a power shaft 8 from the tractor, as is common, a lever 9 being associated with the drawbar and machine for vertically adjusting the gathering points of the latter.

The frame of the machine in part comprises the forwardly extending beams 10 connected to lower transverse members 11, 11' and to an upper transverse member 12 by standards 13, which directly support the corn gathering and picking mechanisms and the discharging chute 14', and which frame also supports the driven shaft 15 actuated by the power shaft 8 for operating the harvester mechanisms at the same time with those of the sheller or other interchangeable attaching units, as will appear. Also forming part of the frame are vertical supporting members 16 connected at their lower ends to the member 11 and which extend and are secured to the elevator casing 17 in which an elevator 18 is installed for delivering material into an interchangeably mounted unit, such as a husker 19, which is secured to the frame, at 20, and also at its upper side by one or more straps or braces 21 connecting it with the transverse member 12, as well as bolt fastenings 22 connecting the unit to the supports 16, all of which parts may be readily detached for removing one unit to be replaced by another.

When it is desired to use a conveyor 24, indicated in Fig. 5, it is but necessary to attach the unit to the transverse and upright members in the manner described, when such unit will be in fixed position to receive material from the harvester elevator 18 and convey the same in transverse relation to the machine to the wagon loader comprising a chute section or stump 14 as a permanent part of the unit to which a chute 14' is detachably and hingedly connected so that it may be swung transversely across the machine to reduce the width of the latter for passing through gateways and the like. When the crop is in suitable condition for husking during the harvesting operation it will be understood that the conveyor 24 may be readily detached by disconnecting the fastening means described and a husking unit, as 19, Fig. 6, substituted therefor and secured in like manner as the conveyor, and, when it is desired to shell the ears instead of employing either of the other units, a shelling unit, as 25, Fig. 7, may be installed in the same manner as the conveyor or husker, all of such units being so proportioned as to be properly aligned between the implement wheels with the elevator discharge spout 17' and chute 14' in transverse relation to the gathering mechanisms, as indicated in Figs. 5, 6 and 7. As each unit is attached its operating mechanism will be so connected to the driven shaft 15 that all the rotating elements of the harvester and such attached unit will be actuated simultaneously to function as an entire machine for gathering, picking and elevating corn from the field and discharging the same into the appropriate attachment to be either directly conveyed into a wagon 26 or first husked or shelled, as desired, according to the character of unit installed on the harvester. It will be noted that each interchangeable unit embodies a delivery stump 14 to which, at 27, a conveying chute 14' is hingedly and also detachably connected, by which means I further economize the use of the unitary attachments, in that when a corn harvester with one unit is initially obtained, for example, the husker 19, or conveyor 24, and it is later desired to employ a different unit, as the sheller 25, it is unnecessary to purchase the chute section 14' with the latter, as said element may be readily removed from the husker or conveyor and attached to the sheller, as each unit includes the stump 14, and, therefore, regardless of the number of units but one chute section 14' will be necessary for all.

It will be understood that in operation corn harvesters are subjected to rough usage because of the character of the crop, land and weather conditions, and require vertical adjustments to raise or lower the frame according to crop heights or irregular land conditions, and also requiring tilting by a lever, as 9, supported on the drawbar 6 and connected to the machine 5. In the use of my improved machine, contemplating the attachment of a plurality of units for different treatments of a crop, appreciable variation in weight exists between the different units, so that means must be provided for properly balancing each unit according to its weight, and, therefore, I mount the harvester upon crank axles 30 at opposite sides of the frame, pivotally supported in frame members 5', and secured by keepers 31, the supporting member 32 of the axle extending forwardly, Fig. 8, and then turned at right angles to form a spindle 33 for a wheel 34, said axle having associated therewith a hanger 35 connected to a brace or anchor 36 having its upper end connected to an upright 5'' of the frame including a series of holes 37, so that when the frame is adjusted vertically, as indicated in Figs. 8 and 9, it may be retained in such adjusted positions by the brace 36 when the latter is secured by the bolt 38.

In order to properly balance the respective units a series of perforations 40, 41, 42, is provided in the frame members 5', and corresponding aligned perforations 43, 44, 45, are provided in the keepers 31. When a conveyor unit, as 24, is to be attached the inwardly extending crank section 30 of the axle is inserted through the hole 40 and the corresponding hole 43 in the keeper 31, so that when both wheels are thus mounted the axis of each spindle 33 will be moved forwardly in alignment in relation to the machine, and about which axis the entire machine is balanced and may be readily tilted by manipulating lever 9. When the shelling unit 25, Fig. 7, is to be substituted for the conveyor unit the axles 30 are inserted through holes 41 and the corresponding aligned holes 44 in keeper 31, which throws the wheel and its axis rearwardly, and, as the sheller is heavier in weight than the conveyor, the harvester is thus adjusted to properly balance the sheller unit; and in like manner, when the husking unit, which is heavier than the others, is to be installed, the axles 30 are inserted through the last holes 42 and into corresponding aligned holes 45 in the keepers, 31, Fig. 12, which moves the wheel and consequently its axis still further rearwardly, Fig. 8, so that the husking unit will be nicely balanced. Obviously the sequential order of attachments may be changed according to the weight of the respective units. Therefore, the frame members 5' constitute graduated bearings for the axles, and in transposing them in the manner described I provide simple means for varying the relation of the wheel axis to the frame, thus balancing the harvester, according to the weight of the unit carried thereby, by the employment of a pair of axles applicable by simple transposition to accomplish the various balances required without modification in any particular, and by which axles the machine may also be readily vertically adjusted in the manner hereinbefore described. While I have shown and described the member 5' and keeper 31 provided with aligned perforations I desire to be understood as not limiting myself to such specific arrangement, as it will be apparent that any equivalent means may be employed by which the axle 30 may be advanced and retracted to change its relation to the frame for accomplishing my object.

I claim as my invention:

1. In a machine of the class described, a frame, crop gathering means supported on the frame, said frame including a plurality of axle bearings, crop treating means mounted on the frame, means associated with the gathering means for conveying material therefrom into the crop treating means, and a wheeled axle adapted to be removably mounted in the axle bearings and transposed from one to another of said bearings to vary the axis of the wheel in relation to the frame for balancing the latter and the elements associated therewith.

2. In a machine of the class described embodying a frame, an axle on the frame, a wheel on the axle, means associated with the frame whereby one of a plurality of interchangeable crop treating elements embodying actuating mechanisms different from each of the others may be operatively secured to the frame and removed therefrom and replaced by either of the other elements, and means associated with the frame and axle for vertically adjusting the frame and also for transposing the axis of the wheel to different locations in relation to the frame for balancing the machine.

3. In a machine of the class described, a frame including a plurality of bearings, a ground wheel supporting the frame, gathering means supported by and mounted at one side of the frame adjacent one of the ground wheels, crop treating means mounted on the frame rearwardly of the gathering means and so located as to receive material from the gathering means, and wheel supporting means adapted to be mounted in a predetermined bearing in the frame whereby the axis of the wheel may be adjusted to varying locations in relation to the frame.

4. In a machine of the class described, a frame including a plurality of perforations, a keeper on the frame and having perforations therein aligning with those in the frame, and a wheel supporting axle insertable through the perforations in the frame and keeper for supporting the frame.

5. In a machine of the class described, a perforated frame member, a keeper arranged in parallel relation to and having perforations in alignment with those in the frame member, an axle adapted to be mounted in predetermined aligned perforations in the frame and keeper, and a wheel on the axle for supporting the frame.

6. In a machine of the class described, a frame including a plurality of bearings, gathering means mounted on the frame, crop treating means mounted on the frame rearwardly of and so located as to receive material from the gathering means, wheel supporting means adapted to be mounted in a predetermined bearing of the frame, and means adjacent the bearings for receiving and securing the wheel supporting means.

7. In a machine of the class described embodying a frame, an axle on the frame, a wheel on the axle, means associated with the frame whereby one of a plurality of interchangeable crop treating elements may be secured to the frame and removed therefrom and replaced by either of the other elements, and means associated with the axle and frame for transposing the axis of the wheel to different locations in relation to the frame for balancing the machine.

8. In a machine of the class described, a frame including a plurality of axle bearings, a ground wheel for supporting the frame, crop gathering means supported on the frame, a crop treating element carried by the frame rearwardly of the wheel and so located as to receive material from the gathering means, and an axle connecting the wheel to and adjustably mountable in either of said bearings whereby when a crop treating element of predetermined weight is attached to the frame the wheel axis will lie adjacent the gathering means and when such elements of greater weights are attached said axle may be adjusted to position the wheel axis farther from the gathering means.

9. In a machine of the class described embodying a frame, means associated with the frame whereby one of a plurality of interchangeable crop treating elements of varying weights may be secured to the frame and detached therefrom and replaced by either of the other elements, and means associated with the frame and adjustable in relation thereto for balancing each of said elements according to its weight.

10. In a machine of the class described embodying a frame, means associated with the frame whereby one of a plurality of interchangeable crop treating elements of varying weights may be secured to the frame and detached therefrom and replaced by either of the other elements, and means associated with the frame and adjustable forwardly and rearwardly in relation thereto for balancing the machine with any of said elements attached.

WALLACE F. MACGREGOR.